Feb. 22, 1966   E. E. KETTERER   3,236,539
CHILD'S WAGON WITH RETRACTABLE HANDLE
Filed Oct. 2, 1963
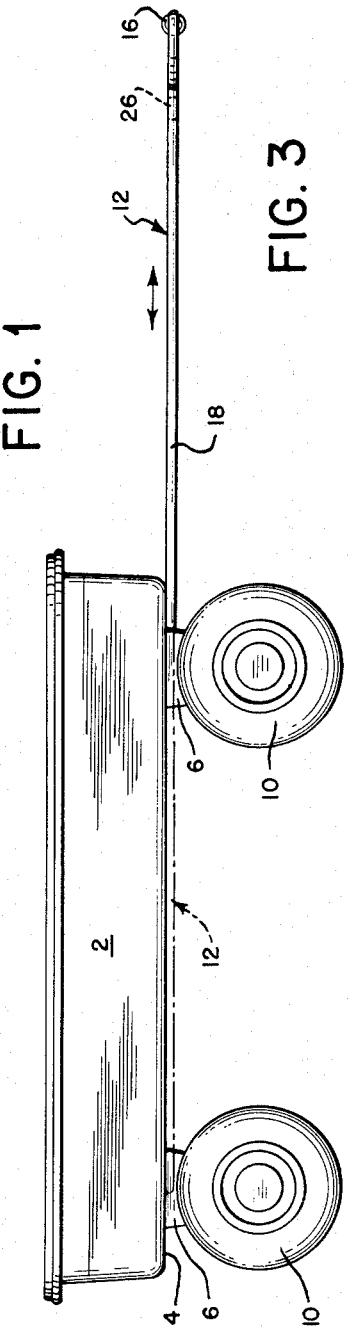
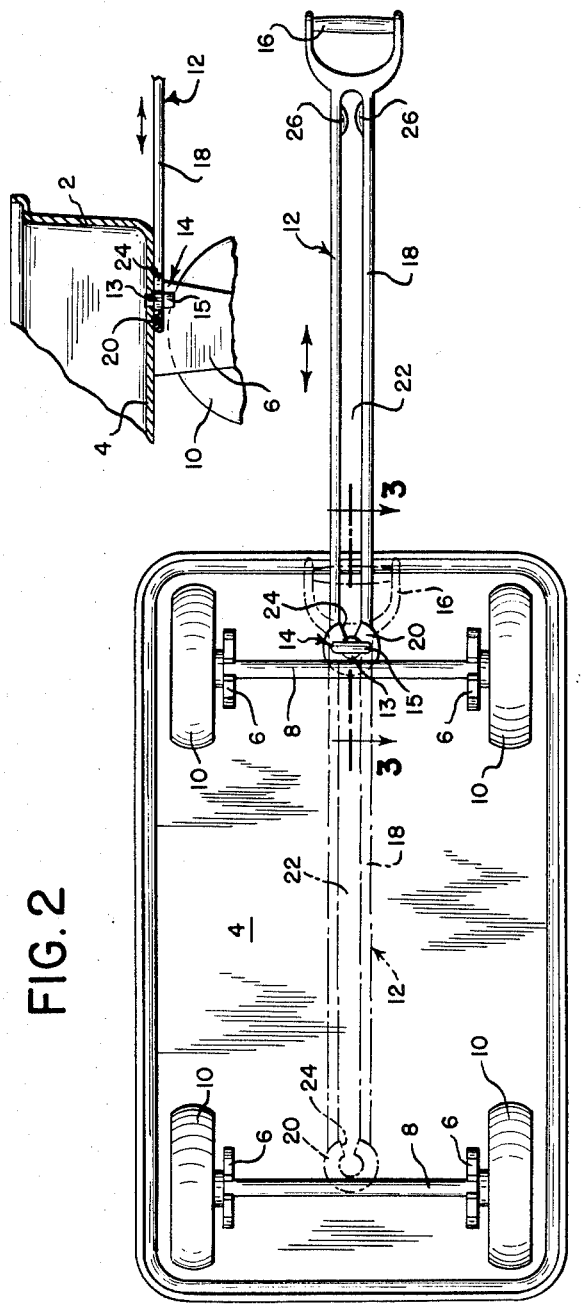
INVENTOR
Ernest E. Ketterer
BY
ATTORNEYS

3,236,539
CHILD'S WAGON WITH RETRACTABLE HANDLE

Ernest E. Ketterer, Wayne, N.J., assignor to Banner Plastics Corporation
Filed Oct. 2, 1963, Ser. No. 313,348
8 Claims. (Cl. 280—87.01)

This invention is for a toy wagon and is particularly directed to a wagon having a retractable handle. The invention has a special reference to a retractable handle which in its extended position functions as a wagon pull and in its retracted position is locked beneath the wagon bed.

Wagon handles of conventional design are not retractable. Thus it is difficult to package the wagon in a container for shipping. To facilitate packaging, such wagons are often shipped with the handle disassembled. Obviously, the re-assembling of the wagon is annoying to the ultimate user. In the case of small toy wagons there is the additional problem of losing the disassembled handle. The present invention overcomes the limitation of fixed wagon handles and of disassembled handles by providing a handle which may be slid under the wagon bed for the purposes of packing, shipping, and storing and may thereafter be extended into operating position.

Broadly, the present invention is for a wagon having a wagon bed, a plurality of wheels attached to the wagon bed and a retractable handle which may be slid under and locked into posiiton beneath the wagon bed. The unique retracting means resides in the cooperation of a capped bearing pin and a slotted shank of the wagon handle.

In the preferred embodiment of the invention, the shank of the handle is slotted along its longitudinal axis so that it may slide past the capped pin along the length of the shank. At one end of the handle is a hand grip. At the end opposite the hand grip the shank is provided with a bearing ring which functions as a journal for pivoting the handle about the capped pin, when the handle is in its extended position. The bearing ring is split at one portion to provide an opening which communicates between the slot in the shank and the interior of the bearing ring. The opening between the bearing ring and the slot is preferably restricted to keep the capped pin withing the bearing ring when the handle is in the extended position. At the initial phase of sliding the handle beneath the wagon bed, the handle must be forced past the pin.

Located near the hand grip end of the slot are two nibs protruding into the slot. These nibs function to retain the handle in its retracted position when the handle is beneath the wagon bed. The nibs are dimensioned so that the handle may be snapped into position about the capped pin.

A full understanding of the invention will be had by reference to the drawings which show the preferred embodiment of the invention.

FIG. 1 is an elevation of the wagon.
FIG. 2 is a bottom view of the wagon.
FIG. 3 is a section illustrating the journal coupling of the handle to the wagon bed.

The toy wagon comprises a main body portion 2 having a wagon bed 4. Upon the underside of the wagon bed 4 are attached struts 6 upon which are mounted axles 8 with rotatable wheels 10.

A retractable handle, denoted generally as 12, is pivotally mounted upon the underside of the wagon bed 4 by a capped pin 14. Capped pin 14 comprises a pin shank 13 and a cap 15. The retractable handle 12 is shown in its normal extended position. The dotted line representations in FIGS. 1 and 2 illustrate the handle 12 in its retracted position beneath the wagon bed 4.

The handle 12 has a hand grip 16 at one end of shank 18 and a bearing ring 20 at the other end. A longitudinal slot 22 runs substantially the length of shank 18. Slot 22 has a transverse dimension greater than the diameter of pin shank 13 and is in communication with the interior of bearing ring 20 via a split 24 in a portion of ring 20. The width of split 24 is preferably restricted to a size less than the diameter of pin shank 13. Near the hand grip end of slot 22 are a pair of nibs 26 which protrude inwardly of the slot 22. The nibs 26 are dimensioned such that the space between them is less than the diameter of pin shank 13.

When handle 12 is in its normal extended position, capped pin 14 is positioned within bearing ring 20. Thus handle 12 may be pivoted about the capped pin 14. Since split 24 in ring 20 forms an opening narrower than the diameter of capped pin 14, the wagon handle 12 will be held in the same position relative to the axis of the capped pin 14 when in normal use.

When it is desired for the purposes of packing or storing that the handle 12 be retracted, pressure applied at the hand grip end and along the longitudinal axis of retractable handle 12 will force the bearing ring 20 out of position and past the capped pin 14. To permit the passage of capped pin 14 through the split 24 in bearing ring 20 a suitable semi-rigid material must be chosen. For example, a thermoplastic synthetic material such as a polyethylene would be appropriate.

Once the bearing ring 20 is forced out of position past the capped pin 14 the retractable handle 12 may be slid along the length of the slot 22 in shank 18 to a retracted position beneath the wagon bed 4. To secure the handle 12 in its retracted position additional pressure is applied along the longitudinal axis of the handle to snap nibs 26 past capped pin 14. Again, a suitable semi-rigid material is called for.

I claim:
1. A toy wagon comprising a wagon bed, a plurality of rotatable wheels connected thereto, a capped bearing pin attached to the underside of said wagon bed, and a retractable handle pivotally connected in its extended position to said capped bearing pin, said retractable handle comprising
  (a) a shank having a hand grip at one end,
  (b) a longitudinal slot in said shank, said slot slidably receiving said bearing pin therein, and
  (c) a bearing ring at the other end of said shank, said bearing ring being split so that the interior of said ring communicates with said slot to permit sliding said handle underneath said wagon bed, said bearing having a holding effect upon said bearing pin when they are mutually engaged.

2. A toy wagon comprising a wagon bed, a plurality of rotatable wheels connected thereto, a capped bearing pin attached to the underside of said wagon bed, and a retractable handle pivotally connected in its extended position to said capped bearing pin, said retractable handle comprising
  (a) a shank having a hand grip at one end,
  (b) a longitudinal slot in said shank, said slot slidably receiving said bearing pin therein,
  (c) a nib near the hand grip end of said shank and protruding inwardly of said slot, said bearing pin releasably confinable between said nib and the grip end of said slot, and
  (d) a bearing ring at the other end of said shank, said bearing ring being split so that the interior of said ring communicates with said slot to permit sliding said handle underneath said wagon bed, said bearing ring having a holding effect upon said bearing pin when they are mutually engaged.

3. A toy wagon comprising a wagon bed, a plurality of rotatable wheels connected thereto, a capped bearing pin attached to the underside of said wagon bed, and a retractable handle pivotally connected in its extended position to said capped bearing pin, said retractable handle comprising (a) a shank having a hand grip at one end,
(b) a longitudinal slot in said shank, said slot slidably receiving said bearing pin therein, and
(c) a bearing ring at the other end of said shank, said bearing ring being split to form a restricted opening between said slot and the interior of said bearing ring to permit sliding said handle underneath said wagon bed, said bearing ring having a holding effect upon said bearing pin when they are mutually engaged.

4. A toy wagon comprising a wagon bed, a plurality of rotatable wheels connected thereto, a capped bearing pin attached to the underside of said wagon bed, and a retractable handle pivotally connected in its extended position to said capped bearing pin, said retractable handle comprising (a) a shank having a hand grip at one end,
(b) a longitudinal slot in said shank, said slot slidably receiving said bearing pin therein,
(c) a nib near the hand grip end of said shank and protruding inwardly of said slot, said bearing pin releasably confinable between said nib and the grip end of said slot, and
(d) a bearing ring at the other end of said shank, said bearing ring being split to form a restricted opening between said slot and the interior of said bearing ring to permit sliding said handle underneath said wagon bed, said bearing ring having a holding effect upon said bearing pin when they are mutually engaged.

5. A toy wagon comprising a wagon bed, a plurality of rotatable wheels connected thereto, a capped bearing pin attached to the underside of said wagon bed, and a retractable handle pivotally connected in its extended position to said capped bearing pin, said retractable handle comprising (a) a handle shank having a hand grip at one end,
(b) a longitudinal slot in said shank, said slot having a transverse dimension greater than the pin shank diameter of said capped pin, and said slot slidably receiving said bearing pin therein,
(c) a nib near the hand grip end of said handle shank protruding inwardly of said slot and reducing the transverse dimension of said slot to less than the pin shank diameter of said capped pin, said bearing pin releasably confinable between said nib and the grip end of said slot, and
(d) a bearing ring at the other end of said shank having an interior diameter greater than the pin shank diameter of said capped pin, said bearing ring further being split to form a restricted opening between said slot and the interior of said bearing ring, said restricted opening having a width less than the pin shank diameter of said capped pin, said bearing ring having a holding effect upon said bearing pin when they are mutually engaged.

6. In a toy wagon having a wagon bed, a plurality of rotatable wheels connected thereto, and a capped bearing pin attached to the underside of said wagon bed, the improvement comprising a retractable handle pivotally connected in its extended position to said capped bearing pin, said retractable handle comprising (a) a shank having a hand grip at one end,
(b) a longitudinal slot in said shank, said slot slidably receiving said bearing pin therein, and
(c) a bearing ring at the other end of said shank, said bearing ring being split to form a restricted opening between said slot and the interior of said bearing ring to permit sliding said handle underneath said wagon bed, said bearing ring having a holding effect upon said bearing pin when they are mutually engaged.

7. In a toy wagon having a wagon bed, a plurality of rotatable wheels connected thereto, and a capped bearing pin attached to the underside of said wagon bed, the improvement comprising a retractable handle pivotally connected in its extended position to said capped bearing pin, said retractable handle comprising (a) a shank having a hand grip at one end,
(b) a longitudinal slot in said shank, said slot slidably receiving said bearing pin therein,
(c) a nib near the hand grip end of said shank and protruding inwardly of said slot, said bearing pin releasably confinable between said nib and the grip end of said slot, and
(d) a bearing ring at the other end of said shank, said bearing ring being split to form a restricted opening between said slot and the interior of said bearing ring to permit sliding said handle underneath said wagon bed, said bearing ring having a holding effect upon said bearing pin when they are mutually engaged.

8. In a toy wagon having a wagon bed, a plurality of rotatable wheels connected thereto, and a capped bearing pin attached to the underside of said wagon bed, the improvement comprising a retractable handle pivotally connected in its extended position to said capped bearing pin, said retractable handle comprising (a) a handle shank having a hand grip at one end,
(b) a longitudinal slot in said shank having a transverse dimension greater than the pin shank diameter of said capped pin, said slot slidably receiving said bearing pin therein,
(c) a nib near the hand grip end of said handle shank protruding inwardly of said slot and reducing the transverse dimension of said slot to less than the pin shank diameter of said capped pin, said bearing pin releasably confinable between said nib and the grip end of said slot, and
(d) a bearing ring at the other end of said shank having an interior diameter greater than the pin shank diameter of said capped pin, said bearing ring further being split to form a restricted opening between said slot and the interior of said bearing ring, said restricted opening having a width less than the pin shank diameter of said capped pin, said bearing ring having a holding effect upon said bearing pin when they are mutually engaged.

References Cited by the Examiner
UNITED STATES PATENTS

| | | | |
|---|---|---|---|
| 1,775,652 | 9/1930 | Mosby | 280—491 |
| 1,816,691 | 7/1931 | Notzke | 280—87.01 |
| 2,675,101 | 4/1954 | Bartlett | 280—47.37 X |
| 3,169,028 | 2/1965 | Scrivner | 280—478 |

A. HARRY LEVY, *Primary Examiner.*

LEO FRIAGLIA, *Examiner.*